(12) United States Patent
Park

(10) Patent No.: US 9,869,504 B2
(45) Date of Patent: Jan. 16, 2018

(54) REFRIGERANT CHANNEL-INTEGRATED ICE MAKING TRAY AND METHOD FOR MANUFACTURING SAME

(71) Applicant: Dongbu Daewoo Electronics Corporation, Seoul (KR)

(72) Inventor: Won Gu Park, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 132 days.

(21) Appl. No.: 14/836,842

(22) Filed: Aug. 26, 2015

(65) Prior Publication Data

US 2016/0370067 A1    Dec. 22, 2016

(30) Foreign Application Priority Data

Jun. 17, 2015   (KR) .................. 10-2015-0085952

(51) Int. Cl.
  *F25C 1/04*    (2006.01)
  *F25C 1/24*    (2006.01)
  *B29C 45/26*   (2006.01)

(52) U.S. Cl.
  CPC .......... *F25C 1/243* (2013.01); *B29C 45/2628* (2013.01)

(58) Field of Classification Search
  CPC .... F25C 1/04; F25C 1/225; F25C 1/12; F25C 1/24
  USPC .......................................... 62/340, 349, 356
  See application file for complete search history.

(56) References Cited

U.S. PATENT DOCUMENTS

| 5,193,357 | A  | * | 3/1993  | Kohl .................. B21C 23/10 |
|           |    |   |         | 62/347 |
| 6,286,331 | B1 | * | 9/2001  | Lee ................... F25B 39/024 |
|           |    |   |         | 62/340 |
| 7,757,511 | B2 | * | 7/2010  | LeClear ............... F25C 1/04 |
|           |    |   |         | 312/402 |
| 8,616,018 | B2 |   | 12/2013 | Jeong et al. |
| 2010/0011786 | A1 |   | 1/2010  | Shin et al. |
| 2010/0257877 | A1 |   | 10/2010 | Yun et al. |
| 2013/0167574 | A1 |   | 7/2013  | Yoon |

FOREIGN PATENT DOCUMENTS

| JP | 2005-321180 A   | 11/2005 |
| KR | 10-2008-0061179 A | 7/2008 |
| KR | 10-2010-0082189 A | 7/2010 |
| KR | 10-2010-0113936   | 10/2010 |
| KR | 10-2011-0080101   | 7/2011 |
| KR | 10-2013-0078530 A | 7/2013 |
| KR | 10-2014-0113788 A | 9/2014 |

* cited by examiner

Primary Examiner — Melvin Jones

(57) ABSTRACT

A refrigerant channel-integrated ice making tray includes an ice making tray configured to have a number of partition ribs for containing water; and a refrigerant channel configured to traverse under the partition ribs inside of the ice making tray.

13 Claims, 7 Drawing Sheets

2

REFRIGERANT CHANNEL-INTEGRATED ICE MAKING TRAY AND METHOD FOR MANUFACTURING SAME

RELATED APPLICATION

This application claims priority to Korean Patent Application No. 10-2015-0085952, filed Jun. 17, 2015, hereby incorporated by reference in its entirety.

TECHNICAL FIELD

Embodiments according to the present invention relate to an ice maker for a refrigerator, and more particularly to a refrigerant channel-integrated ice making tray in which an ice making tray is integrally formed with a refrigerant channel, which simplifies manufacturing of the ice making tray and increases the efficiency of the transfer of cold air generated by the refrigerant to the ice making tray, by making the refrigerant channel by injection molding at the bottom portion of a number of partition ribs, which form spaces to contain water to be used to make ice, when the ice making tray is injection molded.

BACKGROUND

In general, a refrigerator is an appliance with storage space for storing food at a reduced temperature, consisting of a refrigerator compartment maintaining a temperature a few degrees above the freezing point of water and a freezer compartment maintaining a temperature below the freezing point of water. Recent higher demand for ice contributes to increasing demand for a refrigerator equipped with an ice maker that can automatically make ice.

The ice maker may be installed in the freezer compartment depending on the type of a refrigerator, or in the refrigerator compartment if required.

FIG. 1 shows an example ice maker installed in the freezer compartment. The ice maker 100 has an ice storage unit 102 for storing ice as shown in FIG. 1, and the ice stored in the ice storage unit 102 may be dispensed to the outside through an ice dispenser unit in accordance with an external ice dispensing signal. In this case, if more ice than a prescribed amount of ice is dispensed to the outside, information is provided as feedback to enable the ice maker 100 to make ice again, and the ice may be introduced into the ice storage unit 102 again.

As shown in FIG. 2A and FIG. 2B, in the ice maker 100, a refrigerant pipe 202 is attached at the bottom portion of the ice making tray 200 in which the ice is usually made. When making ice, the refrigerant is allowed to flow through the refrigerant pipe 202 and thus water contained in the ice making tray 200 is turned into ice by cold air generated by the refrigerant.

However, the conventional ice maker is fabricated through a process in which the refrigerant pipe and the ice making tray are separately injection molded and the refrigerant pipe is then attached at the bottom portion of the ice making tray, which reduces the efficiency of the transfer of cold air from the refrigerant pipe to the ice making tray.

SUMMARY

In view of the above, embodiments according to the present invention provide a refrigerant channel-integrated ice making tray in which an ice making tray is integrally formed with a refrigerant channel, which simplifies manufacturing of the ice making tray and increases the efficiency of transfer of cold air produced with the refrigerant in the refrigerant channel, by making the refrigerant channel together by injection molding at the bottom portion of a number of partition ribs, which form spaces to contain water to be used to make ice, when the ice making tray is injection molded.

In accordance with an embodiment of the present invention, a refrigerant channel-integrated ice making tray includes: an ice making tray configured to have a number of partition ribs for containing water; and a refrigerant channel configured to traverse inside of the ice making tray under the bottom portion of the partition ribs.

Further, the ice making tray may include an inlet and an outlet for the refrigerant channel which are formed at one side and at the other side of the bottom area of the partition ribs at one end of the ice making tray.

Further, the ice making tray may be configured to connect with an exterior refrigerant supply pipe at the inlet and the outlet of the refrigerant channel.

Further, the refrigerant channel may be configured to have a U shape.

Further, the refrigerant channel may be configured to traverse the partition ribs in the U shape, and a plurality of connection channels are disposed in the form of a ladder between a first portion and a second portion of the U shape in a way that connection channels cross below and between the central area of the bottom portion of each of partition ribs and connect the first portion with the second portion of the U shaped refrigerant channel.

Further, the refrigerant channel may be injection molded as a pipe with a cross-section in the shape of a circle or a polygon.

Further, the inlet and the outlet may be configured to have a size and a shape corresponding to a size and a shape of the refrigerant supply pipe.

Further, the refrigerant channel may be integrally manufactured together with the ice making tray through an injection mold.

In accordance with an embodiment of the present invention, a method for manufacturing a refrigerant channel-integrated ice making tray includes: preparing a base member made from synthetic resin; forming an ice making tray at one (a first) side of the base member; and forming a refrigerant channel at another side (e.g., opposite the first side) of the base member.

Further, the base member may be injection molded to integrally form the ice making tray and the refrigerant channel.

Further, the refrigerant channel may be configured to traverse under the bottom portion of a number of partition ribs in the ice making tray, the partition ribs forming spaces for containing water to be made into ice.

Further, the operation of forming a refrigerant channel may include forming an inlet and an outlet of the refrigerant channel at one side and the other side of the bottom area of the partition ribs on one side surface (at one end) of the ice making tray.

Further, the operation of forming a refrigerant channel may include forming the refrigerant channel to have a U shape.

Further, the refrigerant channel may be configured to traverse the partition ribs in the U shape, and the refrigerant channel may be further configured to have a plurality of connection channels that are disposed in the form of a ladder in a way that they cross below the central area between the bottom portion of each of the partition ribs and connect a first portion of the U shaped refrigerant channel with a second portion of the U shaped refrigerant channel.

As described above, in accordance with an embodiment of the present invention, the refrigerant channel-integrated ice making tray in which an ice making tray is integrally formed with a refrigerant channel is embodied by making the refrigerant channel together by injection molding at the bottom portion of a number of partition ribs, which form spaces to contain water to be used to make ice, when the ice making tray is injection molded so that the ice making tray is integrally formed with the refrigerant channel, which realizes a simplified manufacturing process for the ice making tray and increased efficiency of transfer of cold air produced with the refrigerant in the refrigerant channel.

BRIEF DESCRIPTION OF THE DRAWINGS

The above and other objects and features of the present invention will become apparent from the following description of the embodiments given in conjunction with the accompanying drawings, in which.

DETAILED DESCRIPTION

Hereinafter, example embodiments of the invention will be described with reference to the accompanying drawings. In the following description, well-known functions and/or structures will not be described in detail if they would unnecessarily obscure the features of the present invention. Further, the terms to be described below are defined in consideration of their functions in the embodiments of the present invention and may vary depending on a user's or operator's intention or practice.

Figure 1:
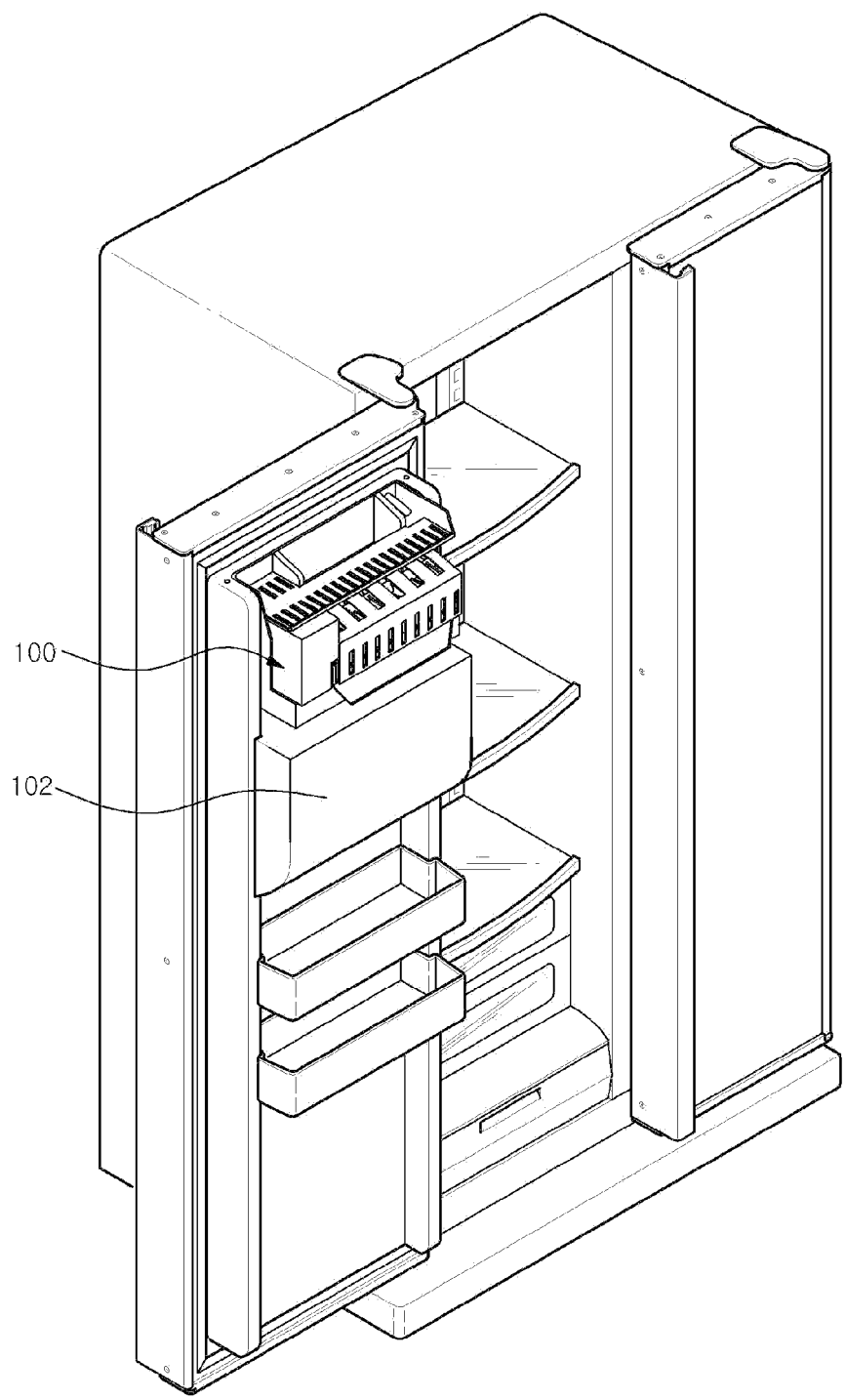
FIG. 1 shows a diagram in which an ice maker is installed in a freezer compartment of a conventional refrigerator.
Figure 2A:
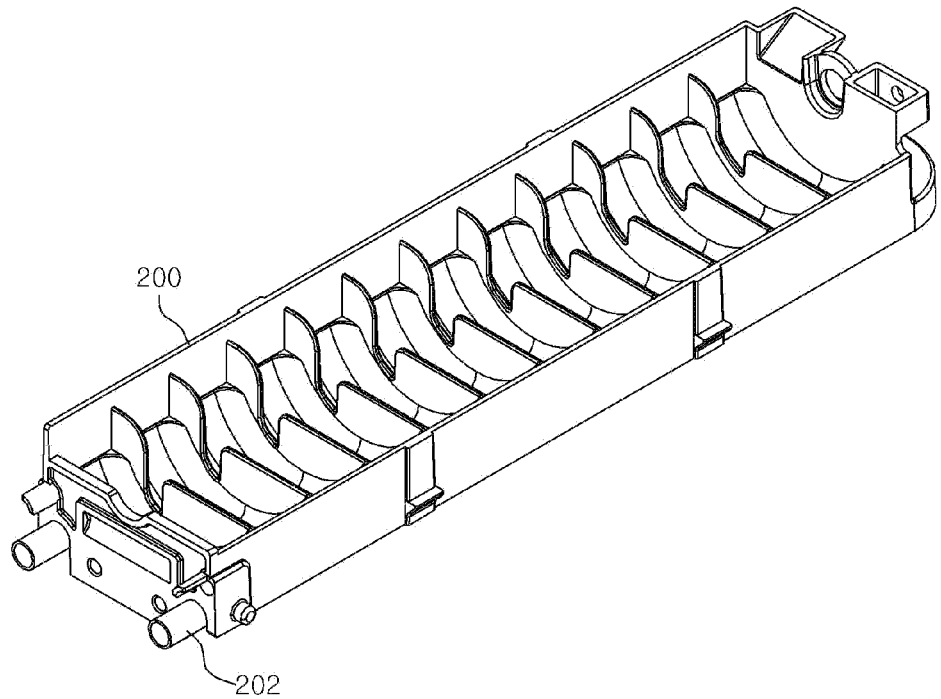
FIG. 2A and FIG. 2B are diagrams of a conventional ice making tray having a refrigerant pipe attached thereto.
Figure 2B:
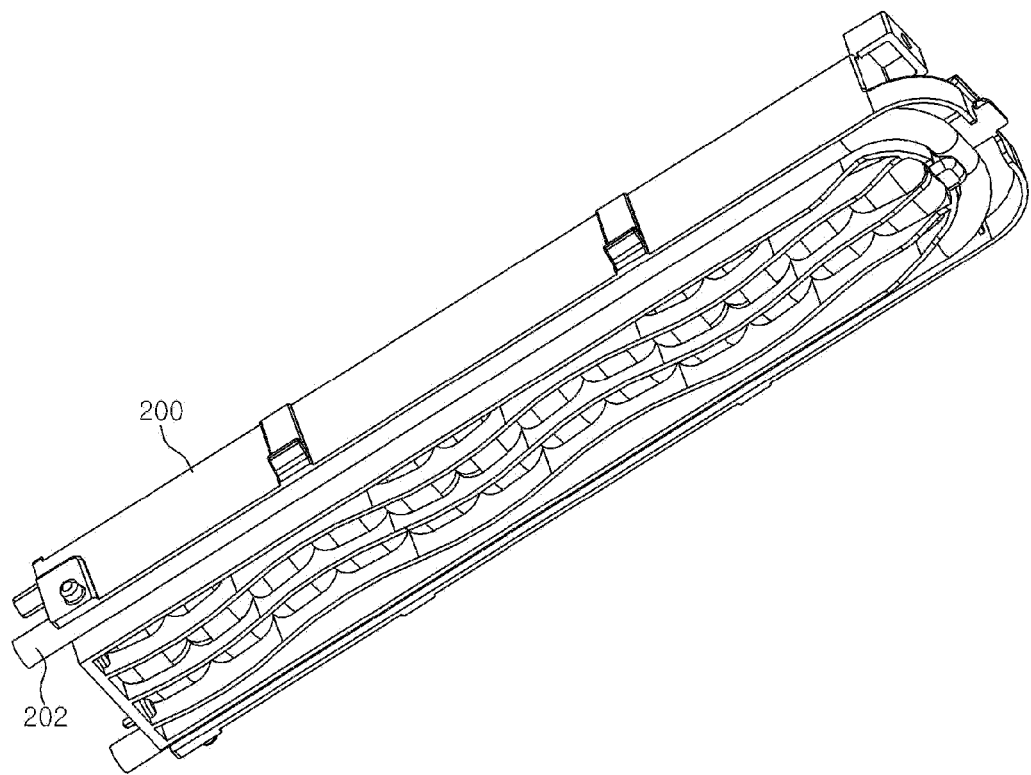
Figure 3A:
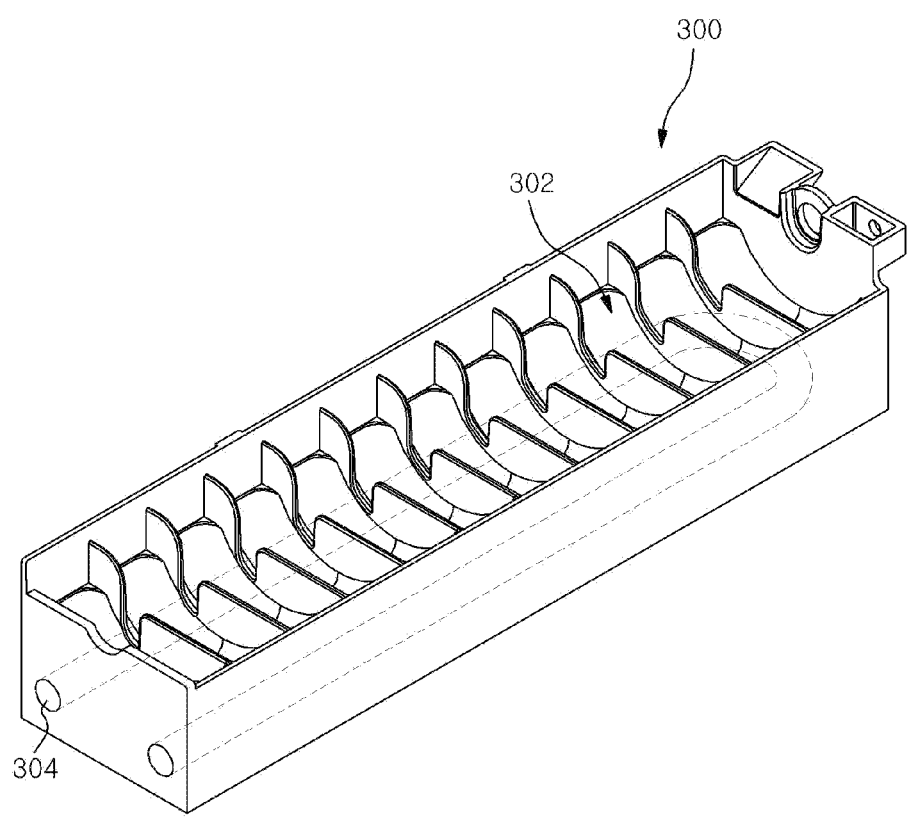
FIGS. 3A, 3B and 3C are a perspective view, a rear view, and a cross-sectional view of a refrigerant channel-integrated ice making tray in accordance with an embodiment of the present invention.
Figure 3B:
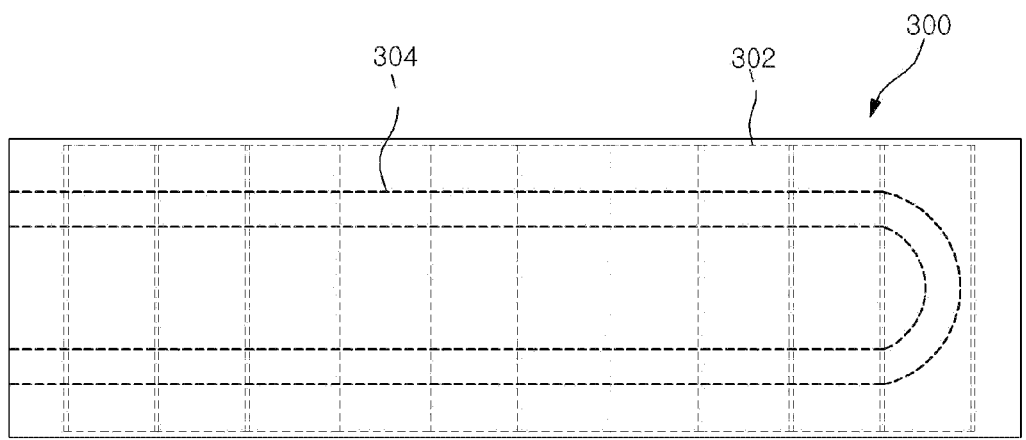
Figure 3C:
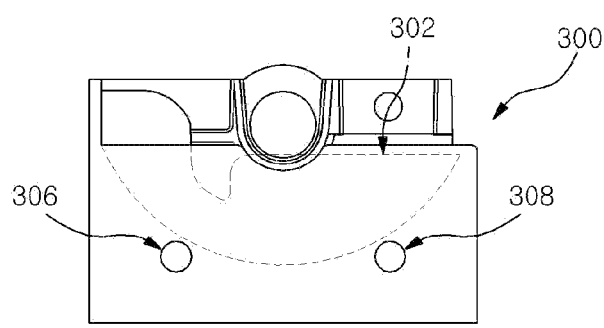

FIG. 3A to FIG. 3C are a perspective view, a rear view, and a cross-sectional view of a refrigerant channel-integrated ice making tray in accordance with an embodiment of the present invention.

With reference to a perspective view of the ice making tray in FIG. 3A, a number of partition ribs 302 are arranged inside of the refrigerant channel-integrated ice making tray of the present invention at regular intervals; therefore, the ice making tray 300 is divided into a plurality of spaces.

Water to be used to make ice may be contained in a space above/between each of partition ribs 302, and water may be turned into ice by cold air generated as a result of a refrigerant flowing through the refrigerant channel 304.

As described above, a prior art ice making tray is manufactured by separate injection molding of a refrigerant pipe and of an ice making tray and attaching the refrigerant pipe at the bottom portion of the ice making tray so that cold air can be transferred from the refrigerant pipe to the ice making tray. As a result, the efficiency of cold air transfer may be reduced.

In order to overcome the above shortcoming, in the present invention, the refrigerant channel-integrated ice making tray 300 is implemented by making a refrigerant channel 304 by injection molding at the bottom portion of each of partition ribs 302 during injection molding of the ice making tray 300.

Consequently, when a refrigerant flows through the refrigerant channel 304 which is integrally formed inside of the ice making tray 300, cold air generated with the refrigerant is directly transferred to each of partition ribs 302 which are formed in the ice making tray 300 so that the transfer efficiency of the cold air can be increased.

In other words, as shown in the cross-sectional view of FIG. 3B, the refrigerant channel 304 is integrally formed inside of the ice making tray 300, and the refrigerant channel 304 is formed together with the ice making tray 300 by injection molding. Accordingly, it is not necessary to separately manufacture a refrigerant pipe as in the prior art, and thus a process for attaching the manufactured refrigerant pipe to the bottom portion of the ice making tray is not needed.

The refrigerant channel 304 may be positioned at the bottom portion of and under each of the partition ribs 302 in the ice making tray 300. In this configuration, a channel made by a separate pipe is not inserted, but the channel is formed by injection molding along with the other part(s) of the ice making tray 300. Accordingly, cold air derived from the refrigerant may be directly transferred to each of partition ribs 302 in the ice making tray 300 while the refrigerant flows through the refrigerant channel 304 when making ice, and consequentially the transfer efficiency of the cold air may be increased relative to the conventional design.

Furthermore, the ice making tray 300 in which the refrigerant channel 304 is integrally formed may include, for example, an inlet 306 and an outlet 308 of the refrigerant channel 304 which are respectively formed at one side and at the other side at the bottom portion of the partition ribs 302 on one side surface (at one end) of the ice making tray 300, but the invention is not limited to this. In the example of FIG. 3A, the cross-sections of the inlet 306 and the outlet 308 of the refrigerant channel 304 are illustrated as circles, but the invention is not limited thereto; the cross-sections of the inlet and outlet may be formed in a size and a shape corresponding to the size and shape of a refrigerant supply pipe (not shown). Further, the refrigerant channel 304, other than a portion of the inlet 306 and the outlet 308 that are being connected with the refrigerant supply pipe, may be formed in the form of a circle or polygonal pipe (that is, the cross-sectional shape of the refrigerant channel 304 may be different from the cross-sectional shapes of the inlet 306 and the outlet 308).

Further, in accordance with an embodiment of the present invention, since the ice making tray 300 is formed to integrally include the refrigerant channel 304, the inlet 306 and the outlet 308 of the refrigerant channel 304 may be readily connected to the refrigerant supply pipe at the time of coupling of the ice making tray with the refrigerant supply pipe through which the refrigerant is supplied.

Additionally, as shown in a rear view of FIG. 3B, the refrigerant channel 304 may be arranged under the bottom portion of each of the partition ribs 302 in the ice making tray to traverse each of partition ribs 302, for example, as a "U" shape, and ice may be made by having a low temperature and pressure refrigerant flow through the refrigerant channel during an ice making process.

Figure 4A:
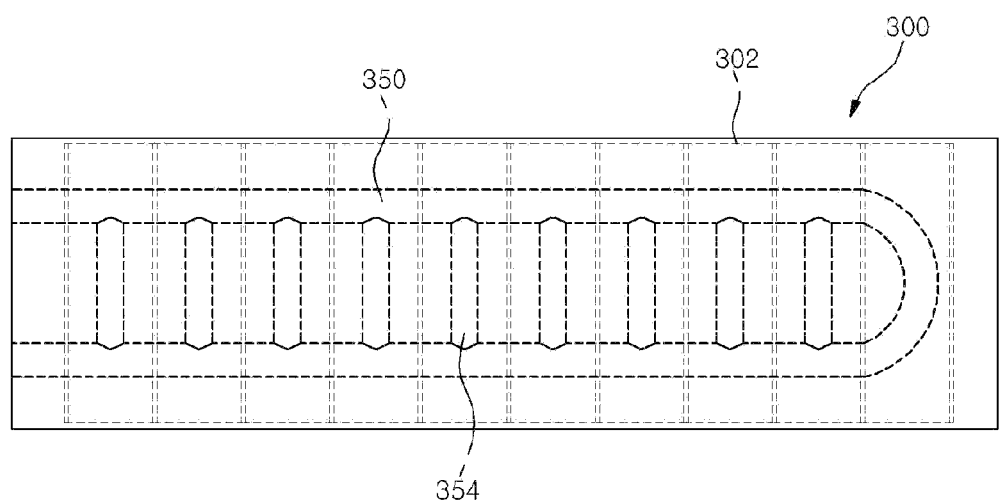
FIGS. 4A and 4B are a rear view and a cross-sectional view of a refrigerant channel-integrated ice making tray in accordance with another embodiment of the present invention.
Figure 4B:
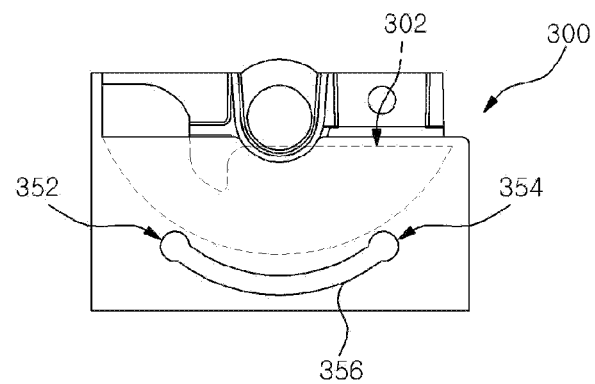

FIG. 4A and FIG. 4B are a rear view and a cross-sectional view of the refrigerant channel-integrated ice making tray in accordance with another embodiment of the present invention.

With reference to a rear view of FIG. 4A, in comparison to the refrigerant channel as shown in FIG. 3B, a refrigerant channel 350 integrally formed in the ice making tray 300 is arranged under the partition ribs 302 in the ice making tray 300 as a "U" shape traversing all of the partition ribs, and the refrigerant channel is also arranged with cross-wise connections between (e.g., below but at the center of) each of the partition ribs 302, such that the refrigerant channel is also disposed in the central area between each adjacent pair of the partition ribs 302.

In other words, as shown in a rear view of FIG. 4A, in accordance with another embodiment of the present invention, the refrigerant channel 350 is disposed as a first portion and a mirror-image second portion that are connected in a "U" shape that traverses the partition ribs 302, and includes a plurality of connection channels that are disposed in the form of a ladder in a way that they cross the central area below and between the bottom portion of each of partition ribs 302 and connect the first portion and the second portion of the U shaped portion of the refrigerant channel.

In accordance with the FIG. 4A embodiment in which the refrigerant channel 350 is arranged in the central area below and between each of the partition ribs 302, when the refrigerant flows through the refrigerant channel 350 during an ice making process, the cold air derived from the refrigerant is directly transferred to the top, bottom and central areas of each of the partition ribs 302 in the ice making tray 300 so that the efficiency of transferring the cold air can be further increased.

FIG. 4B shows a cross-sectional view of the ice making tray. As can be seen, an inlet 352 and an outlet 354 having a U shape and traversing a number of the partition ribs 302 may be formed inside of the ice making tray 300, and the connection channel 356 may be formed in the central area below and between each of the partition ribs 302.

Figure 5:
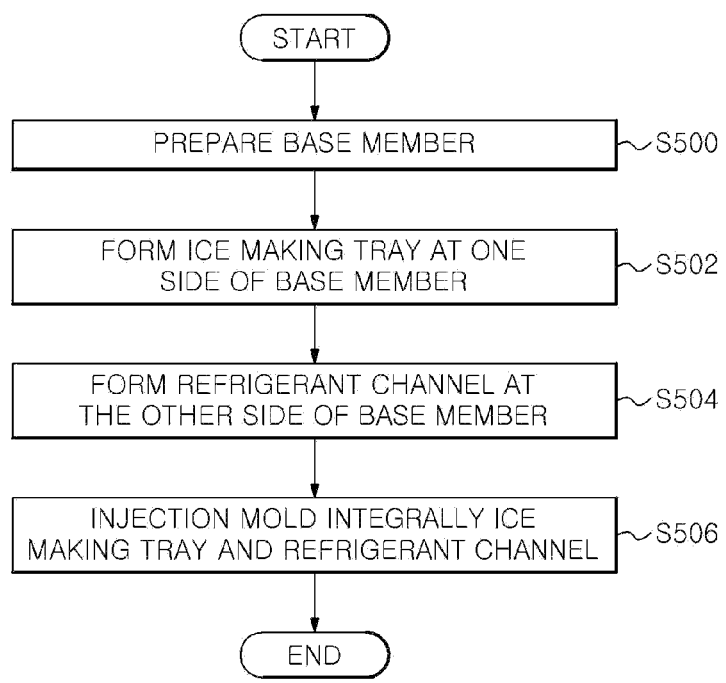
FIG. 5 is a flow diagram showing a method of manufacturing the refrigerant channel-integrated ice making tray in accordance with an embodiment of the present invention.

FIG. 5 is a flow diagram showing a method of manufacturing the refrigerant channel-integrated ice making tray in accordance with an embodiment of the present invention. Hereinafter, embodiments of the present invention will be described in detail with reference to FIG. 3A to FIG. 3C, FIG. 4A to FIG. 4B, and FIG. 5.

A base member, for example, made from synthetic resin, is prepared at operation 500, and the ice making tray 300 is formed at one side (e.g., on one surface) of the base member, at operation 502. In an embodiment, the formation of the ice making tray 300 in operation 502 includes forming a number of partition ribs 302 for containing water to be used to make ice, and the number of partition ribs 302 may be formed on the upper side of the base member.

Next, the refrigerant channels 304, 350 are formed at the other side of the base member in which the ice making tray 300 is formed, at operation 504. In an embodiment, the refrigerant channels 304, 350 may be formed at the bottom area where the partition ribs 302 are formed on the base member. In addition, the refrigerant channels 304, 350 being formed like this may be connected to an exterior refrigerant supply pipe by forming the inlets 306, 352 and the outlets 308, 354 of the refrigerant channels 304, 350 at one side and at the other side of the bottom area of the partition ribs 302 at one end of the ice making tray 300.

Through the aforementioned process, the ice making tray 300 and the refrigerant channels 304 and 350 may be integrally arranged at one side and at the other side of the base member, and the base member may be injection molded to integrally form the ice making tray 300 including the refrigerant channels 304 and 350, at operation 506.

As described above, in accordance with the present invention, the refrigerant channel-integrated ice making tray in which an ice making tray is integrally formed with a refrigerant channel is embodied by making the refrigerant channel by injection molding at the bottom portion of a number of partition ribs, which are formed to form spaces to contain water to be used to make ice, when the ice making tray is injection molded so that the ice making tray is integrally formed with the refrigerant channel, which realizes a simplified manufacturing process for the ice making tray and increased efficiency of transfer of the cold air generated by the refrigerant in the refrigerant channel to the ice making areas of the ice making tray.

While the description of the present invention has been made with reference to the example embodiments, various changes and modifications may be made without departing from the scope of the present invention. In other words, although the embodiments of the present invention describe a structure of an ice making tray in which the refrigerant channel and the ice making tray are integrally formed by together being injection molded, the ice making tray may also or instead be used as an evaporator in cooling cycles of the ice maker if needed. In other words, if the refrigerant being supplied to the refrigerant channel of the ice making tray is employed to perform a heat exchange, a separate evaporator for the ice maker for use in a refrigerator is not needed; therefore, an arrangement of the ice maker may be simplified and the efficiency of transferring cold air may be also increased.

While the description of the present invention has been made to the example embodiments, various changes and modifications may be made without departing from the scope of the present invention, and the present invention is not limited to the described embodiments. Therefore, the scope of the present invention should be defined by the appended claims rather than by the foregoing embodiments.

What is claimed is:

1. A refrigerant channel-integrated ice making tray, comprising:
   a ice making tray configured to have a number of partition ribs for containing water; and
   a refrigerant channel configured to traverse inside of the ice making tray under the bottom portion of the partition ribs, wherein the refrigerant channel is integrally manufactured together with the ice making tray through an injection mold.

2. The refrigerant channel-integrated ice making tray of claim 1, wherein the ice making tray comprises an inlet and an outlet for the refrigerant channel which are formed at one side and at the other side of the bottom area of the partition ribs at one end of the ice making tray.

3. The refrigerant channel-integrated ice making tray of claim 2, wherein the ice making tray is configured to connect with an exterior refrigerant supply pipe at the inlet and the outlet of the refrigerant channel.

4. The refrigerant channel-integrated ice making tray of claim 2, wherein the inlet and the outlet are configured to have a size and a shape corresponding to a size and a shape of a refrigerant supply pipe.

5. The refrigerant channel-integrated ice making tray of claim 1, wherein the refrigerant channel is configured to have a U shape.

6. The refrigerant channel-integrated ice making tray of claim 1, wherein the refrigerant channel is configured to have a first portion and a second portion that form a U shape, and wherein the refrigerant channel further comprises a plurality of connection channels that are disposed to cross below the partition ribs and connect the first portion and the second portion of the U shaped refrigerant channel.

7. The refrigerant channel-integrated ice making tray of claim 1, wherein the refrigerant channel is injection molded with a cross-section in a shape selected from the group consisting of: a circle and a polygon.

8. A method for manufacturing a refrigerant channel-integrated ice making tray, the method comprising:
   preparing a base member made from synthetic resin;
   forming an ice making tray at one side of the base member; and
   forming a refrigerant channel at another side of the base member, wherein the refrigerant channel is integrally manufactured together with the ice making tray through an injection mold.

9. The method of claim 8, wherein the base member is injection molded to integrally form the ice making tray and the refrigerant channel.

10. The method of claim 8, wherein the refrigerant channel is configured to traverse under the bottom portion of a number of partition ribs in the ice making tray, the partition ribs forming spaces for containing water.

11. The method of claim 10, wherein said forming a refrigerant channel comprises:
    forming an inlet and an outlet of the refrigerant channel at one side and the other side of the bottom area of the partition ribs on one side surface of the ice making tray.

12. The method of claim 8, wherein said forming a refrigerant channel comprises:
    forming the refrigerant channel to have a U shape.

13. The method of claim 12, wherein the refrigerant channel is configured to traverse the partition ribs as the U shape having a first portion and a second portion, the refrigerant channel further configured to have a plurality of connection channels that are disposed to cross below the partition ribs and connect the first portion with the second portion of the U shaped refrigerant channel.

* * * * *